(12) United States Patent
Tadakuma

(10) Patent No.: US 8,158,688 B2
(45) Date of Patent: Apr. 17, 2012

(54) DISPERSION LIQUID OF METAL OXIDE FINE PARTICLES, AND MOLDING PRODUCTS USING THE SAME

(75) Inventor: Yoshio Tadakuma, Kanagawa (JP)

(73) Assignee: Fujifilm Corporation, Tokyo (JP)

( * ) Notice: Subject to any disclaimer, the term of this patent is extended or adjusted under 35 U.S.C. 154(b) by 306 days.

(21) Appl. No.: 12/399,280

(22) Filed: Mar. 6, 2009

(65) Prior Publication Data

US 2009/0234028 A1    Sep. 17, 2009

(30) Foreign Application Priority Data

Mar. 12, 2008  (JP) ................................ 2008-062375

(51) Int. Cl.
   *B01J 13/00* (2006.01)
(52) U.S. Cl. ........................................................ 516/98
(58) Field of Classification Search ............... 506/98; 516/98

See application file for complete search history.

(56) References Cited

U.S. PATENT DOCUMENTS

| 6,626,987 B1 * | 9/2003 | Suzuki et al. ............ 106/287.14 |
| 2002/0004544 A1 | 1/2002 | Kolb et al. |
| 2004/0009300 A1 * | 1/2004 | Shimakura et al. ........ 427/407.1 |

FOREIGN PATENT DOCUMENTS

| JP | 10-298287 A | 11/1998 |
| JP | 2002-131502 A | 5/2002 |
| JP | 2003-73559 A | 3/2003 |
| JP | 2003-73563 A | 3/2003 |
| JP | 2003-73564 A | 3/2003 |
| JP | 2003-512287 A | 4/2003 |
| JP | 2003-147090 A | 5/2003 |
| JP | 3524342 A | 5/2004 |
| JP | 2004-244444 A | 9/2004 |

OTHER PUBLICATIONS

Japanese Office Action dated Dec. 20, 2011, corresponding to JP 2008-062375.

* cited by examiner

*Primary Examiner* — Ling Choi
*Assistant Examiner* — Chun-Cheng Wang
(74) *Attorney, Agent, or Firm* — Sughrue Mion, PLLC

(57) ABSTRACT

Provision of a dispersion liquid of metal oxide fine particles, containing: metal oxide fine particles, and a halogen element, in which an amount of the halogen element is 10 ppm to 900 ppm, and pH of the dispersion liquid is 0 to 4.

14 Claims, No Drawings

DISPERSION LIQUID OF METAL OXIDE FINE PARTICLES, AND MOLDING PRODUCTS USING THE SAME

BACKGROUND OF THE INVENTION

1. Field of the Invention

The present invention relates to a dispersion liquid of metal oxide fine particles for use in producing a molding product that requires high transparency.

2. Description of the Related Art

Recently, optical materials are extensively studied, but especially in the field of lenses, a demand continues to exist for optical materials excellent in high refractivity, heat resistance, transparency, easy-to-mold property, lightness, chemical resistance, solvent resistance, and the like.

Plastic lenses are lightweight and unbreakable compared to lenses made of an inorganic material such as glass, and plastic can be formed into lenses having various shapes, and accordingly the plastic lenses are widely and rapidly prevailing not only in eyeglasses but also in optical materials such as lenses for a portable camera and a pickup lens in recent years.

In addition, it is required that the material itself have a high refractive index, aiming at thinning of a lens and downsizing of an image pickup device. For example, techniques have extensively been studied such as a technique in which a sulfur atom is introduced into a polymer (Japanese Patent Application Laid-Open (JP-A) Nos. 2002-131502 and 10-298287), a technique in which a halogen element or an aromatic ring is introduced into a polymer (JP-A No. 2004-244444). However, a plastic material still remains unknown having sufficient refractive index, excellent transparency and light resistance, and capable of displacing glass. It is also to be noted that in an optical fiber or a light guide, materials having different refractive indexes are used in combination and materials having a distribution of refractive index are used. To cope with these materials whose refractive index tends to vary depending on the sites, a technique for controlling arbitrarily a refractive index has been demanded.

Since it is difficult to heighten a refractive index with organic materials alone, a method has been reported in which a resin is made to be highly refractive by dispersing an inorganic material having a high refractive index in the resin matrix (JP-A No. 2003-73559). Meanwhile, in order to lower the decrease of transmitted light by Rayleigh scattering, it is preferable to homogeneously disperse inorganic fine particles having a particle size of 15 nm or less into a resin matrix. However, since a primary particle having a particle size of 15 nm or less is extremely easy to aggregate, it is very difficult to disperse it homogeneously in a resin matrix. Moreover, in view of the decrease of transmitted light in a light path length that corresponds to the thickness of a lens, the addition amount of an inorganic fine particle has to be limited. Thus, it has so far been unable to disperse fine particles into a resin matrix at a high concentration without sacrificing the transparency of a resin.

There are other reports relating to a molding product containing mainly a thermoplastic resin in which ultra fine particles having number average particle diameter of 0.5 nm to 50 nm are dispersed, the molding product being a complex composition molding product in which an average double refraction index at 1 mm of light path length is 10 nm or less (JP-A No. 2003-147090); and an organic/inorganic complex material composition and optical parts made of it, the composition containing a thermoplastic resin having a refractive index represented by a specific numerical formula and Abbe number and inorganic fine particles having a specific average particle diameter and a specific refractive index (JP-A Nos. 2003-73563 and 2003-73564). These techniques also disperse inorganic fine particles in a resin, but cannot achieve sufficient performance in a standpoint of dispersing fine particles at a high concentration in a resin matrix without reducing transparency of the resin.

Although materials to be used in preparing an inorganic particle greatly vary depending on a method of synthesis or a solvent to be used, in synthesizing, for example, an oxidized product by hydrolyzing a metal oxide in an aqueous solution, metal halides or metal oxidized halides is often used in terms of cost and solubility. Of the halides, chlorides are often used in terms of solubility. In the case where a metal oxide is synthesized by hydrolyzing a metal alkoxide, hydrochloric acid is often used as an acid. If the halogens are excessively present in a solution, the inorganic fine particles easily aggregate, making it impossible to produce highly transparent dispersion liquid.

Japanese Patent (JP-B) No. 3524342 refers to the control of chlorine content in aqueous titanium dioxide dispersion liquid and describes that it is better to contain 1000 ppm to 10,000 ppm level of chlorine to enhance adhesive property in forming and sintering a coated thin film. In this document, stabilization is made by removing chlorine ions with electrodialysis and incorporating polyvinylalcohol. The average particle diameter of titanium dioxide is 0.01 μm to 0.1 μm. Although the effect of Rayleigh scattering is marked in this region of particle diameter, it is not problematic even in slightly large particles or even when the particles are aggregated by chlorines because they are used as a thin film. However, the method is not applicable to a molding product having a thickness level of several hundred micrometers to several millimeters, in which light scattering effect is marked, and transparency is too low.

An average primary particle diameter of the inorganic fine particles greatly affects the Rayleigh scattering, provided that the primary particles are dispersed individually without aggregating. However, fine particles are likely to aggregate when the average primary particle diameter is small. Even when the average primary particle diameter is very small, a secondary particle diameter of the aggregates thereof can be large, lowering the transparency by Rayleigh scattering. Here, the term "average primary particle diameter" refers to the average diameter of a circle corresponding to the photograph of a particle obtained by the observation with the use of a transmittance electron microscope (TEM). Thus, it is clear that the transparency of the dispersion liquid or a composite molding product cannot be determined only from the average primary particle diameter.

As a method of determining a particle diameter in a state of a dispersion liquid, a dynamic scattering method is commonly used. If each metal oxide fine particle perfectly stands alone as a primary particle, the particle diameter corresponds to a primary particle diameter, but if the particles are aggregated, the particle diameter corresponds to a secondary particle diameter. Whether a particle diameter obtained by a dynamic scattering method is primary or secondary particle diameter can be determined by the comparison with the data from TEM observation.

The state of the aggregates of metal oxide fine particles depends on the conditions adopted at particle preparation. In the case where the synthesis is conducted at a high temperature aiming at enhancing crystallization or increasing the yield, particles tend to aggregate in such a condition. Likewise, aggregation tends to occur in the condition that the concentration of metal oxide fine particles is extremely high. It is also known that a high concentration of halogen elements in a dispersion liquid results in the aggregation. The required primary particle size or the secondary particle size varies depending on performance of a device that is produced by using the particles, and is regulated by a corresponding synthesis method.

For example, in the case of a transparent conductive film which is produced by coating metal oxide fine particle dispersion liquid on a film, drying it, and firing the dried coating, the thickness of the film is ordinary in the level of several hundred nanometers to several micrometers. As for such a relatively thin film, enough transparency can be secured even when a primary particle diameter or secondary particle diameter exceeds, for example, 30 nm. However, as to an optical device such as lenses for a digital camera, which requires high transparency and thickness of several millimeters, the effect of Rayleigh scattering clearly appears, and accordingly it is necessary for securing transparency to use an inorganic fine particle which are sufficiently small but not in an aggregated state.

The halogen elements contained in a dispersion liquid of metal oxide fine particles are originated from an acid which serves as a catalyst for the synthesis or a compound which is a raw material for the metal oxide fine particles. Therefore, a concentration of halogen elements in the dispersion liquid varies depending on the concentration of the metal oxide fine particles or the acid catalyst to be used. The amount of the halogen elements can be controlled by, for example, ultrafiltration or electrodialysis. As mentioned above, when the concentration of halogen elements is high, the metal oxide fine particles easily aggregate by a salting-out effect and form large secondary particles, meaning that they cannot be used for producing optical devices which require high transparency. Meanwhile, if ultrafiltration is used to reduce the halogen content, the transparency of a sol can be improved to some level of the concentration in accordance with the decrease of halogen content, but the metal oxide fine particles begin to aggregate when pH of the solution greatly exceeds the pH range where each individual particle can be dispersed stably.

If, for example, nitric acid or sulfuric acid is added to regulate the pH, transparency of the sol decreases. But when a carboxylic acid is used in place of nitric acid or sulfuric acid, pH is kept within the pH range corresponding to the range where the fine particles can be present stably, to thereby reducing halogen content without deteriorating the transparency. This is because the carboxyl group of the carboxylic acid adsorbs to the surface of metal oxide fine particles and plays a roll as a dispersant, preventing the particles from aggregation so that the sol is stable with retaining high transparency.

When a carboxylic acid is used as an acid catalyst to prepare metal oxide fine particles, the carboxylic acid may be used from the outset. However, since a carboxylic acid is less effective as a catalyst, hydrochloric acid or nitric acid is often used in many cases. In the latter case, after the metal oxide fine particles are prepared, it is necessary to substitute them with a carboxylic acid.

BRIEF SUMMARY OF THE INVENTION

The object of the present invention is to provide a dispersion liquid of metal oxide fine particles for use in producing a molding product that requires high transparency; and a molding product suitable for lens base material which is excellent in transparency and has a high refractive index, in which the metal oxide fine particles are homogeneously dispersed in a resin matrix.

The above problem can be solved by the following aspects:

<1> A dispersion liquid of metal oxide fine particles, comprising:
    metal oxide fine particles, and
    a halogen element,
    wherein an amount of the halogen element is 10 ppm to 900 ppm, and pH of the dispersion liquid is 0 to 4.

<2> The dispersion liquid of metal oxide fine particles according to <1>, a light transmittance of the metal oxide fine particles at a wavelength of 500 nm at an optical path length of 10 mm is 90% or more.

<3> The dispersion liquid of metal oxide fine particles according to <1>, wherein an amount of the metal oxide fine particles is 0.1% by mass to 20% by mass.

<4> The dispersion of metal oxide fine particles according to <1>, wherein the metal oxide fine particles have an average primary particle diameter of 1 nm to 20 nm.

<5> The dispersion of metal oxide fine particles according to <1>, wherein the metal oxide fine particles contains a metal oxide having at least one metal selected from the group consisting of Zn, Ge, Ti, Zr, Hf, Si, Sn, Mn, Ga, Mo, In, Sb, Ta, V, Y, and Nb; or a complex metal oxide having the metals in combination of two or more.

<6> The dispersion of metal oxide fine particles according to <1>, which further contain water in an amount of 70% by mass or more.

<7> The dispersion of metal oxide fine particles according to <1>, which further contain a carboxylic acid.

<8> The dispersion of metal oxide fine particles according to <7>, wherein the carboxylic acid is acetic acid.

<9> The dispersion of metal oxide fine particles according to <1>, wherein the halogen element is a chlorine atom.

<10> A molding product which is obtainable by molding a complex composition containing:
    a dispersion liquid of metal oxide fine particles, and
    a resin,
    wherein the dispersion liquid of metal oxide fine particles contains at least metal oxide fine particles and a halogen element,
    wherein an amount of the halogen element is 10 ppm to 900 ppm based on the dispersion liquid and a pH of the dispersion liquid is 0 to 4.

<11> The molding product according to <10>, wherein the amount of the halogen element is 400 ppm to 600 ppm.

<12> The molding product according to <10>, wherein the molding product has a refractive index of 1.60 or more at a wavelength of 589 nm and has a light transmittance of 77% or more at a wavelength of 589 nm with respect to a thickness of 1 mm.

<13> The molding product according to <10>, wherein the amount of the metal oxide fine particles is 20% by mass or more.

<14> The molding product according to <10>, which is for use in lens base material.

The present invention can solve conventional problems by providing a dispersion liquid of metal oxide fine particles for use in producing a molding product that requires high transparency; and a molding product suitable for lens base material which is excellent in transparency and has a high refractive index, in which the metal oxide fine particles are homogeneously dispersed in a resin matrix.

DETAILED DESCRIPTION OF THE INVENTION (Dispersion Liquid of Metal Oxide Fine Particles)

The dispersion liquid of metal oxide fine particles of the present invention contains at least metal oxide fine particles and if necessary, water, a carboxylic acid, and other components.

In the dispersion liquid of metal oxide fine particles, concentration of halogen elements is 10 ppm to 900 ppm.

The state of aggregation of the metal oxide fine particles in the dispersion liquid of metal oxide fine particles depends greatly on the pH and the halogen content. The higher the halogen content is, the easier the metal oxide fine particles can aggregate. Thus, the lower end of halogen content in the solution is preferably as low as possible, but in view of time required for removing the halogens and the cost, the halogen content is preferably 10 ppm or more. The upper end thereof is preferably 900 ppm or less, more preferably 700 ppm or less, even more preferably, 500 ppm or less.

If the concentration is beyond 900 ppm, the particles often aggregate and the transparency is lowered.

As the halogen element, a chlorine atom is preferable in terms of raw material for the metal oxide fine particle, cost, solubility, and the like, and the concentration of chlorine atom is preferably within the above-mentioned range.

The concentration of halogen element can be measured, for example, using a combustion halogen analyzer (AQF-100, produced by Mitsubishi Chemical Analytech Co., Ltd.).

Concentration of the halogen element in dispersion liquid of the metal oxide fine particles can be controlled by centrifugation, ultrafiltration or electrodialysis.

In the centrifugation, since the dispersed particles are once aggregated and the supernatant is removed by a centrifuge, the efficiency of separation may be high, but when the particles are dispersed again, the aggregated particles are not decomposed completely, so that the formed secondary particles deteriorate the transparency of the dispersion liquid of the metal oxide fine particles. Accordingly, as a method of removing halogens, electrodialysis or ultrafiltration is preferable.

The pH of the dispersion liquid of the metal oxide fine particles is 0 to 4, preferably 0 to 2. If the pH exceeds 4, aggregation appears depending on the type of the metal oxide, which can lower the transparency.

In removing halogens, in order to adjust the pH of the metal oxide fine particles, an acid is preferably incorporated. Preferable acids include a carboxylic acid, phosphoric acid, and phosphonic acid. Of these, a carboxylic acid is more preferable because of high particle dispersibility of a carboxylic acid. The carboxylic acid is, for example, acetic acid.

The light transmittance of the dispersion liquid of metal oxide fine particles is preferably 90% or more. If the light transmittance is lower than 90%, a light transmittance of a composite molding product also reduces, with the result that the product is practically not usable as an optical material.

The light transmittance can be determined by incorporating the dispersion liquid of metal oxide fine particles into, for example, a quartz cell having a light path length of 10 mm, and then measuring the dispersion liquid with an ultraviolet-visible absorption spectrum measuring apparatus (UV-3100, produced by Shimadzu Corporation) at a wavelength of 500 nm.

Examples of the metal of the metal oxide fine particles include at least one selected from the group consisting of Zn, Ge, Ti, Zr, Hf, Si, Sn, Mn, Ga, Mo, In, Sb, Ta, V, Y, and Nb. The metal oxide fine particle preferably includes a metal oxide containing any one of the metals, or a complex metal oxide containing any combination of two or more of the metals.

Specific examples of the metal oxide include $ZnO$, $GeO_2$, $TiO_2$, $ZrO_2$, $HfO_2$, $SiO_2$, $Sn_2O_3$, $Mn_2O_3$, $Ga_2O_3$, $Mo_2O_3$, $In_2O_3$, $Sb_2O_3$, $Ta_2O_5$, $V_2O_5$, $Y_2O_3$, and $Nb_2O_5$.

Examples of the complex metal oxide include a complex oxide of titanium and zirconium; a complex oxide of titanium, zirconium and hafnium; a complex oxide of titanium and barium; a complex oxide of titanium and silicon; a complex oxide of titanium, zirconium and silicon; a complex oxide of titanium and tin; and a complex oxide of titanium, zirconium and tin.

Of these, it is preferable to use those in which titanium accounts for 60 atomic % or more with respect to the whole metal atoms constituting the complex metal oxide, more preferably those in which titanium and tin account for 70 atomic % or more with respect to the whole metal atoms constituting the complex metal oxide. With the use of any of these complex metal oxides, a dispersion liquid of metal oxide fine particle having a high refractive index can be obtained.

More specifically, it is preferable that the complex metal oxide consists of oxides of Ti, Sn and Zr, and that Ti and Sn account for 70 atomic % to 98 atomic % of the whole metal atoms and Zr accounts for the rest thereof.

It is preferable that X-ray diffraction pattern of the complex metal oxide indicates a rutile structure.

It is possible to coat the surface of the metal oxide fine particle with a material having a low activity of photocatalyst, or in addition to the coating, to dope a metal that couples electrons and positive holes.

Preferable examples of such a metal oxide include $TiO_2$, $ZrO_2$, and $SnO_2$, of which $TiO_2$ is more preferable because of its high refractive index. Further, a complex metal oxide of $TiO_2$ and tin, having a rutile structure, has a higher refractive index. It is more preferable to form the rutile complex metal oxide of tin and titanium as a core, and coat the surface with $ZrO_2$, $Al_2O_3$, $SiO_2$, or the like. The fine particles may be metal oxide fine particles whose surface is modified with a silane coupling agent or titanate coupling agent, aiming at lowering of photocatalytic activity and lowering of water absorption.

A method of producing the metal oxide fine particles is not particularly limited and may be any of conventional methods. For example, a required oxide fine particle can be obtained by hydrolyzing a metal salt or metal alkoxide, as a raw material, in a reaction system containing water.

Examples of the metal salt include chlorides, bromides, iodides, nitrates, sulfates, and organic acid salts, of the preferable metals. Examples of the organic acid salts include acetates, propionates, naphthenates, octylates, stearates, and oleates. Examples of the metal alkoxides include methoxides, ethoxides, propoxides, and butoxides, of the preferable metals. As a method of preparing the inorganic fine particles may be used a known method, for example, as described in the Japanese Journal of Applied Physics, vol. 37, p. 4603-4608 (1998), or the Langmuir, vol. 16 (1), p. 241-246 (2000).

In the case where metal oxide nano particles are produced by a sol-production method, like a production of titanium oxide nano particles using titanium tetrachloride as a raw material, it is possible to take a process in which a precursor such as a hydroxide is first prepared, and then the precursor is dehydrated and condensed by an acid or an alkali, or deflocculated to obtain a hydrosol. In such a process using a precursor, it is preferable to isolate and purify the precursor by any method such as filtration or centrifuge in terms of purity of the target product.

The inorganic fine particles may be produced through, in addition to the above-mentioned hydrolysis in water, a process in an organic solvent in which a thermoplastic resin may be dissolved. Examples of the organic solvent usable in the process include acetone, 2-butanone, dichloromethane, chloroform, toluene, ethyl acetate, cyclohexanone, and anisole. These solvent may be used solely or in combination of two or more.

As for the number average particle diameter of the metal oxide fine particle, if it is too small, a specific performance of the material constituting the fine particle can be changed, but conversely, if it is too large, the affection of Rayleigh scattering is remarkable, extremely lowering the transparency of the complex composition. The lower end of the number average particle diameter of the metal oxide fine particle of the present invention is preferably 1 nm or more, more preferably, 2 nm or more, even more preferably 3 nm or more. The upper end is preferably 20 nm or lower, more preferably 10 nm or lower, even more preferably 7 nm or lower. Specifically, the number average particle diameter of the metal oxide fine particle of the present invention is preferably 1 nm to 20 nm, more preferably 2 nm to 10 nm, even more preferably 3 nm to 7 nm.

The number average particle diameter can be measured with an x-ray diffractometer (XRD), or a transmission electron microscope (TEM).

The refractive index of the metal oxide fine particle at 22° C., at a wavelength of 589 nm, is preferably 1.9 to 3.0, more preferably 2.0 to 2.7, even more preferably 2.1 to 2.5. If the refractive index is higher than 3.0, the difference in the refractive index between the particle and the resin is so large that prevention of Rayleigh scattering is difficult. If the refractive index is lower than 1.9, the effect of the refractive index may not be enough for achieving the original purpose.

The refractive index of the fine particle can be estimated by a method in which the refractive index of a transparent film prepared by compounding the particle with a resin is measured by use of Abbe refractometer (e.g., DM-M4, produced by Atago Co., Ltd.), and the obtained refractive index is compared with a refractive index which has been measured for a resin component alone. Alternatively, the refractive index of the fine particle can be obtained by measuring the refractive indices of the dispersion liquids of the metal oxide fine particles having various concentrations, and based thereon, calculating the refractive index of the fine particle.

The dispersion liquid of the metal oxide fine particles contains water, and the amount of the water is preferably 70% by mass or more, more preferably 80% by mass or more. If the amount of water is less than 70% by mass, for example, in the case where a metal alkoxide is used as a raw material for the metal oxide, gelation can occur under some condition, which impairs formation of particles each having even size, resulting in lowering the transparency. If a metal salt is used as a raw material, the amount of water cannot be reduced in terms of solubility. Moreover, if the amount of water is poor, an apparatus such as electrodialytic apparatus cannot be used in the desalting process, and so the desalting can be constrained.

(Molding Product)

The molding product of the present invention is obtained by molding a complex composition containing the dispersion liquid of the metal oxide fine particles, a resin, and if necessary, other components.

The concentration of halogen elements in the molding product is preferably 400 ppm to 6,000 ppm, more preferably 400 ppm to 1,000 ppm, based on the whole the metal oxide fine particles. If the halogen concentration is lower than 400 ppm, though there is no problem in the performance, the operation of removing the salt is overloaded, resulting in a cost increase. If the halogen concentration is higher than 6,000 ppm, the aggregation of the particles in the dispersion liquid cannot sufficiently be deflocculated even by adding a dispersant, which may cause the lowering of the transparency.

Here, the concentration of halogen can be measured using, for example, a combustion halogen analyzer (AQF-100, produced by Mitsubishi Chemical Analytech Co., Ltd.).

The refractive index of the molding product at a wavelength of 589 nm is preferably 1.60 or more, more preferably 1.65, even more preferably 1.67 or more.

In order to thin the lens or to downscale a shooting unit, it is required that a lens has a high refractive index. A commercially available thermoplastic resin has a refractive index in the order of 1.6. If the refractive index of the molding product is lower than 1.60, a resin alone is necessary and there is no merit for forming a complex material molding product in terms of costs.

The refractive index can be determined, for example, with Abbe refractometer (e.g., DM-M4, produced by Atago Co., Ltd.).

The light transmittance of the molding product per a thickness of 1 mm at a wavelength of 589 nm is preferably 77% or more, more preferably 80% or more. If the light transmittance is 77% or more, lens base material having excellent properties can easily be obtained.

The light transmittance of the molding product per a thickness of 1 mm is obtained by preparing a base plate of 1.0 mm in thickness and measuring it with an ultraviolet-visible absorption spectrum measuring apparatus (UV-3100, produced by Shimadzu Corporation).

The concentration of the metal oxide fine particles in the molding product is preferably 20% by mass or more, more preferably 30% by mass to 50% by mass. If the concentration is lower than 20% by mass, a molding product having a sufficiently high refractive index is not necessarily obtained.

Although the complex composition that forms the molding product of the present invention contains a resin and the metal oxide fine particle as essential components thereof, some additives such as another resin, a dispersant, plasticizer, and a releasing agent may also be added.

The complex composition preferably has a glass transition temperature of 100° C. to 400° C., more preferably 130° C. to 380° C. This is because that sufficient heat resistance can be obtained at 100° C. or more and that a molding process tends to be easy at a glass transition temperature of 400° C. or less.

<Resin>

The resin is not particularly limited and may be selected appropriately, according to the purpose, from known resins, including a thermoplastic resin and hardening resin.

—Thermoplastic Resin—

The thermoplastic resin is not particularly limited and may be selected appropriately, according to the purpose, from known resins. Examples thereof include poly(meth)acrylate, polystyrene, polyamide, polyvinylether, polyvinylester, polyvinylcarbazol, polyolefin, polyester, polycarbonate, polyurethane, polythiourethane, polyimide, polyether, polythioether, polyetherketone, polysulphone, and polyethersulphone. These resins may be used solely or in combination of two or more.

As the thermoplastic resin, it is preferable to use a thermoplastic resin having a functional group, at a terminal or a side chain, capable of performing a chemical bond to metal oxide fine particles, from a point of view that such thermoplastic resin can prevent the metal oxide fine particle from aggregating to thereby realize homogeneous dispersion. As such functional groups, preferable are the following.

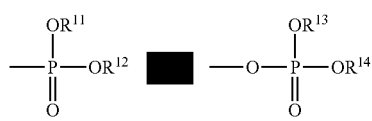

In the above formulas, $R^{11}$, $R^{12}$, $R^{13}$, and $R^{14}$ individually represent a hydrogen atom, a substituted or non-substituted alkyl group, a substituted or non-substituted alkenyl group, a substituted or non-substituted alkynyl group, a substituted or non-substituted aryl group, —$SO_3H$, —$OSO_3H$, —$CO_2H$, or $Si(OR^{15})_{m1}R^{16}_{3-m1}$ (where $R^{15}$ and $R^{16}$ represent individually a hydrogen atom, a substituted or non-substituted alkyl group, a substituted or non-substituted alkenyl group, a substituted or non-substituted alkynyl group, or a substituted or non-substituted aryl group, and m1 is an integer of 1 to 3).

Herein, examples of the chemical bond include a covalent bond, an ionic bond, a coordination bond, and a hydrogen bond. When there are plural functional groups, each functional group may form a different kind of chemical bond with the metal oxide fine particle. Whether to perform a chemical bond or not is judged from whether the functional group of the thermoplastic resin forms a chemical bond with metal oxide fine particles when the thermoplastic resin is mixed with the metal oxide fine particles. The functional groups may, partly or wholly, bind chemically to the metal oxide fine particle.

A mass average molecular weight of the thermoplastic resin is preferably 1,000 to 500,000, more preferably 3,000 to 300,000, even more preferably 10,000 to 100,000. When the mass average molecular weight is 500,000 or lower, the molding processibility tends to be enhanced, and when the mass average molecular weight is 1,000 or more, a mechanical strength tends to be enhanced.

Herein, the mass average molecular weight of the thermoplastic resin is a molecular weight determined as a polystyrene conversion by using a GPC analyzer with a column such as TSKGEL GMHXL, TSKGEL G4000HXL, or TSKGEL G2000HXL (trademarks of the products of Tosoh Corporation) using tetrahydrofuran as a solvent through a differential refractometer detector.

In the thermoplastic resin, the number of the functional groups that bind to the metal oxide fine particles is preferably 0.1 to 20 on average per one polymer chain, more preferably 0.5 to 10, even more preferably 1-5. When the average number of the functional groups is 20 or less per one polymer chain, the thermoplastic resin can coordinate to plural metal oxide fine particles, thereby preventing occurrence of high viscosity and gellation in a solution state. When the average number of the functional groups per one polymer chain is 0.1 or more, the metal oxide fine particles can stably be dispersed.

A glass transition temperature of the thermoplastic resin is preferably 80° C. to 400° C., more preferably 130° C. to 380° C. Use of a thermoplastic resin having a glass transition temperature of 80° C. or higher enables to obtain optical parts having sufficient thermal resistance. Use of a thermoplastic resin having a glass transition temperature of 400° C. or lower enables to enhance molding processibility.

—Hardening Resin—

As a hardening resin, a known resin having a structure that is hardened by heat or active energy line may be used. Specifically, a monomer or prepolymer may be used having a radical-reactive group (e.g., an unsaturated group such as (meth)acryloyl group, styryl group, and allyl group), cationic-reactive group (e.g., epoxy group, oxetanyl group, episulfide, and oxazolyl), a reactive silyl group (e.g., alkoxysilyl group).

Moreover, a sulfur-containing hardening resin is also preferably used, which is disclosed in JP-A Nos. 05-148340, 05-208950, 06-192250, 07-252207, 09-110979, 09-255781, 10-298287, 2001-342252, and 2002-131502.

In addition to the above-described resins and metal oxide fine particles, various additives may be incorporated into the complex composition, in order to improve dispersion homogeneity, flowability, releasability and weather resistance in the molding process. Further, in addition to the above-mentioned resin, another resin having no such functional group may be added. No limitation is imposed on such another resin, but it is preferable that such resin have an optical property, thermal property, and molecular weight, similar to those of the previously mentioned resins.

An incorporation ratio of the additives varies according to the purpose of use. However, in general, the ratio is preferably 50% by mass or less, more preferably 30% by mass or less, even more preferably 20% by mass or less, with respect to the total amount of the metal oxide fine particle and the thermoplastic resin.

As will be mentioned later, when the resin is mixed with the metal oxide fine particle which is dispersed in water or alcohol, a surface treatment agent for the fine particle other than the above resins may be added for the various purposes, including enhancing extraction property to an organic solvent or substitution property; enhancing homogeneous dispersion into the resin; lowering the water absorption of the fine particles; and enhancing weather resistance. The mass average molecular weight of the surface treatment agent is preferably 50 to 50,000, more preferably 100 to 20,000, even more preferably 200 to 10,000.

As the surface treatment agent, it is preferable to use a compound having the following General Formula (1).

A-B  General Formula (1)

In the General Formula (1), A is a functional group capable of forming an arbitrary chemical bond to the surface of metal oxide fine particle of the present invention, and B is a $C_{1-30}$ monovalent group or a polymer which is compatible or reactive with the resin matrix containing as a main component the resin of the present invention. Here, examples of the chemical bond include covalent bond, ionic bond, coordinate bond, and hydrogen bond.

Preferable examples of the group represented by A are the same as preferable functional groups introduced to the above resin, which are capable of binding to the fine particle.

Meanwhile, the chemical structure of B is preferably the same as or similar to the chemical structure of the resin which is a main body of the resin matrix, in terms of compatibility. In the present invention, in addition to the resin, it is preferable that the chemical structure of B has an aromatic ring.

The surface treatment agent is not particularly limited, and may be selected appropriately depending of the purpose. Examples thereof include p-octyl benzoic acid, p-propyl benzoic acid, acetic acid, propionic acid, cyclopentanecarboxylic acid, dibenzyl phosphate, monobenzyl phosphate, diphenyl phosphate, di-α-naphthyl phosphate, phenyl phosphonic acid, phenyl phosphonic acid monophenyl ester, KAYAMER PM-21 (trademark, produced by Nippon Kayaku Co., Ltd.), KAYAMER PM-2 (trademark, produced by Nippon Kayaku Co., Ltd.), benzene sulfonate, naphthalene sulfonate, paraoctylbenzene sulfonate, or a silane coupling agent as described in any of Japanese Patent Application Laid-Open (JP-A) Nos. 5-221640, 9-100111, and 2002-187921. These surface treatment agents may be used solely or in combination of two or more. The total amount of the surface treatment agent on a mass basis is preferably 0.01 to 2 times, more preferably 0.03 to 1 times, even more preferably 0.05 to 0.5 times, with respect to the metal oxide fine particle.

If the resin of the present invention has a high glass transition temperature, the molding of the complex composition is not necessarily easy. In such a case, a plasticizer may be used to lower the molding temperature of the complex composition. An amount of the plasticizer based on the total amount of the complex composition constituting a transparent molding product is preferably 1% by mass to 50% by mass, more preferably 2% by mass to 30% by mass, even more preferably 3% by mass to 20% by mass.

The plasticizer should be selected in total consideration of compatibility with a resin, weather resistance, plasticizing effect, and the like. It cannot certainly be said what is an optimum plasticizer, because it depends on other components. But in terms of the refractive index, it is preferable to use those having an aromatic ring. As a typical example, a compound having a structure represented by the following General Formula (2).

General Formula (2)

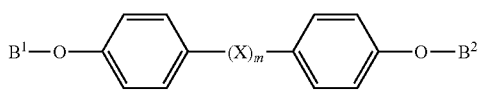

In the General Formula (2), $B_1$ and $B_2$ represent a $C_{6-18}$ alkyl group or a $C_{6-18}$ arylalkyl group, m is 0 or 1, x is one of the following divalent bonding groups.

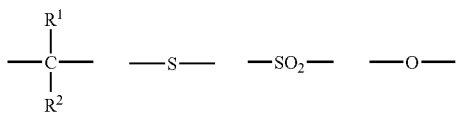

In the leftmost formula, $R^1$ and $R^2$ each represent a hydrogen atom or an alkyl group.

In the compound represented by the General Formula (2), an alkyl or arylalkyl group can be arbitrarily selected within the carbon number range of 6 to 18. If the carbon number is less than 6, the molecular weight is so small that the compounds boil at a melting point of the polymer, generating air bubbles. If the carbon number exceeds 18, compatibility with the polymer is poor and the effect of the addition is insufficient.

Examples of $B_1$ or $B_2$ include a liner alkyl group such as n-hexyl group, n-octyl group, n-decyl group, n-dodecyl group, n-tetradecyl group, n-hexadecyl group, and n-octadecyl group; a branched alkyl group such as a 2-hexyldecyl group, and methyl-branched octadecyl group; or an arylalkyl group such as a benzyl group and 2-phenylethyl group.

Specific examples of the compounds represented by the General Formula (2) include the following compounds.

W-1

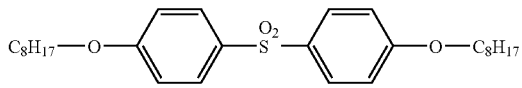

W-2

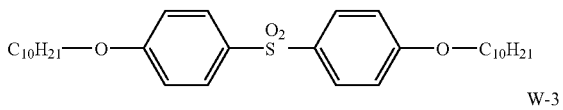

W-3

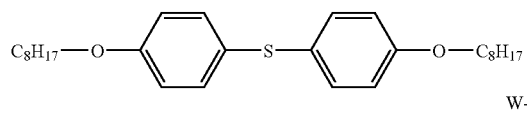

W-4

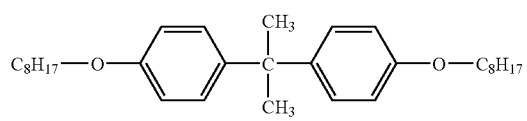

W-5

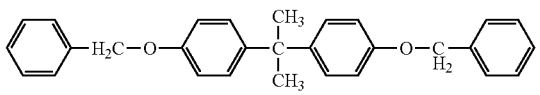

Of these, W-1 (KP-L155, produced by Kao Corporation) is preferable.

Besides the above components, the above complex composition may contain, where appropriate, a known releasing agent such as a modified silicone oil in order to improve molding performance, or a known anti-deterioration agent such as hindered phenol-based, amine-based, phosphorus-based, and thioether-based agents in order to improve light resistance or thermal deterioration. An amount of these components is preferably 0.1% by mass to 5% by mass based on all the solid content of the complex composition.

—Method of Producing the Complex Composition—

The metal oxide fine particles as used in the present invention are dispersed in a resin by binding to the resin having the functional group at the side chain.

The metal oxide fine particles as used in the present invention have a small particle diameter and a high surface energy, so that if they are isolated as a solid, it is difficult to disperse them again. Thus, it is preferable that the metal oxide fine particles are dispersed in a solution and are mixed with the resin to obtain a stable dispersion. Examples of preferable method of producing the complex composition include (1) a method in which the surface of the metal oxide fine particles are treated with the above-mentioned surface treating agent, and the surface-treated metal oxide fine particles are extracted with an organic solvent, and then the extracted metal oxide fine particles are homogeneously mixed with the resin, to thereby yield a complex composition of the metal oxide fine particles and the resin; and (2) a method in which the metal oxide fine particles and the resin are homogeneously mixed with the use of a solvent capable of homogeneously dispersing or dissolving the metal oxide fine particles and the resin, to thereby yield a complex composition of them.

When the complex composition of metal oxide fine particles and the resin is produced according to the method (1), an organic solvent to be used is preferably a water-insoluble organic solvent such as toluene, ethyl acetate, methyl isobutyl ketone, chloroform, dichloroethane, chlorobenzene, and methoxybenzene. The surface treating agent to be used in the extraction of the fine particles to the organic solvent and the resin may be of the same type or different type. The surface treating agent is preferably any of those referred to previously in the description of the surface treating agents.

When mixing the metal oxide fine particles extracted to the organic solvent and the resin, any additive such as a plasticizer, a releasing agent, or a different type of polymer may be added where appropriate.

In the case of method (2), as a solvent, it is preferable to use a hydrophilic polar solvent such as dimethylacetamide, dimethylformamide, dimethylsulfoxide, benzylalcohol, cyclohexanol, ethyleneglycol monomethylether, 1-methoxy-2-propanol, t-butanol, acetic acid, and propionic acid, solely or in combination; or a mixed solvent of the polar solvent and a water-insoluble solvent such as chloroform, dichloroethane, dichloromethane, ethylacetate, methyl ethyl ketone, methyl isobutyl ketone, toluene, chlorobenzene and methoxybenzene. Here, aside from the resin, a dispersant, a plasticizer, a releasing agent, or another polymer may be used if needed. If fine particles dispersed in a mixture of water and methanol are to be used, a hydrophilic solvent is preferably added which has a boiling point higher than that of the mixture of water and methanol and which dissolve a thermoplastic resin. Then the mixture of water and methanol is condensed and removed to disperse the fine particles in the polar organic solvent. The fine particles dispersed in the polar organic solvent are then mixed with the resin. In this mixing process, the surface treating agent may be added.

The solution of the complex composition obtained by the method (1) or (2) can directly be cast-molded to obtain a transparent molding product. In the present invention, however, it is preferable to take a process in which the solution is removed by concentration, freeze-drying or reprecipitation from any appropriate poor solvent, and subsequently the resultant powdered solid product is molded by injection molding, compression molding, or the like.

By molding the complex composition, the molding product of the present invention can be produced. Of the molding products of the present invention, those having the refractive index and the optical performance as described in regard to the complex composition are useful.

The molding product of the present invention is very useful when applied to optical parts having a maximum thickness of 0.1 mm or more and having a high refractive index, more preferably when applied to those having a maximum thickness of 0.1 mm to 5 mm, even more preferably when applied to those having a maximum thickness of 1 mm to 3 mm.

Such a thick molding product is generally difficult to produce through a solution casting process because the solvent is hard to remove sufficiently. However, the material of the present invention is easy to mold and easy to form a complicated shape such as non-spherical surface, can provide a product having an excellent transparency by utilizing high refractive index performance of the metal oxide fine particles.

No particular limitation is imposed on the optical parts using the molding product of the present invention, so long as the optical parts utilize the excellent optical performance of the complex composition of the present invention. For example, the product of the present invention can be used as lens base material, or any light passing optical parts (so called, passive optical parts). Examples of devices equipped with such optical parts include various display devices (e.g., a liquid crystal display and a plasma display), various projector devices (e.g., an OHP and a liquid crystal projector), optical fiber communications equipments (e.g., a light guide and an optical amplifier), and photographing devices such as a camera and a video. Examples of the passive optical parts used in such optical devices include lens, prism, prism sheet, panel, film, light guide, optical disk, and a sealant of LED.

The molding product of the present invention is suitable for lens base material. The lens base material using the molding product of the present invention is excellent in optical performances, having high refractive index, light transmittance, and light weight property at the same time. The refractive index of the lens base material can be freely adjusted by changing the type of the monomer constituting the complex composition or by regulating the amount of the metal oxide fine particles to be dispersed.

The "lens base material" means a single member that achieves a function of lens. On the surface of lens or at the circumference of lens, a film or a member can be mounted according to circumstances or applications of the lens. For example, on the surface of lens can be formed a protective film, an antireflection film, or a hard-coat film. Moreover, the lens base material can be fixed by putting the periphery of the lens into a base material retaining frame. However, these film or frame is an additional member added to the lens base material, which is distinguished from the lens base material itself.

When using the lens base material as lens, the lens base material may be used alone as lens, or may be used as lens accompanied with the above-mentioned film or frame. No particular limitation is imposed on type or shape of the lens using the lens base material. The lens base material of the present invention is used, for example, as lens for spectacles, optical device, optoelectronics, laser, pickup, onboard camera, portable camera, digital camera, OHP, or microlens array.

EXAMPLES

Hereinafter, Examples of the present invention will be described, which should not be construed as limiting the present invention.

In the Examples below, the method of analysis and evaluation are as follows.

<X-Ray Diffraction (XRD) Spectrum Measurement>

The measurement was carried out at 23° C. using RINT1500 (produced by Rigaku Corporation) (X-ray source: cupper K$\alpha$-line; wavelength: 1.5418 Å).

<Measurement of Mass Average Molecular Weight>

The mass average molecular weight of the thermoplastic resin is a molecular weight determined as a polystyrene conversion by using a GPC analyzer with a column such as TSKGEL GMHXL, TSKGEL G4000HXL, or TSKGEL G2000HXL (trademarks of the products of Tosoh Corporation) using tetrahydrofuran as a solvent through a differential refractometer detector.

Example 1

Preparation of a Complex Metal Oxide Fine Particle Dispersion Liquid in which Zr is Further Added to the Sn—Ti Complex Metal Oxide 0.0473 mole of titanium tetraisopropoxide was mixed with 12 ml of ethanol and stirred at room temperature, and 2 ml of concentrated hydrochloric acid was added to the mixture to obtain a transparent solution. Meanwhile, a solution of 0.00591 mole of tin(IV) chloride pentahydrate in 101.3 g of water was prepared at room temperature. The two solutions were mixed and stirred for a while at room temperature to obtain a transparent solution. The solution was then subjected to heat treatment at 80° C. for 30 minutes with stirring, to thereby obtain a slightly cloudy yet translucent sol. 0.0236 mole of zirconium chloride oxide octahydrate was dissolved in 50 ml of water at room temperature, and the resultant aqueous solution was poured for 40 minutes into the sol under heating. After completion of the addition, the sol was subjected to aging at 80° C. for 80 minutes. Then, the aged sol was further stirred for several hours at room temperature and cooled down to obtain a transparent sol.

An X-ray diffraction (XRD) analysis revealed that the obtained sol was a sol of complex metal oxide fine particles having a rutile structure.

The obtained complex metal oxide fine particle dispersion liquid was subjected to ultrafiltration with 2.5% by mass of aqueous acetic aid solution, and the chlorine concentration was maintained to 700 ppm, the concentration of the complex metal oxide fine particles to 4% by mass, and pH to 5.0.

Example 2

A complex metal oxide fine particle dispersion liquid was prepared in the same manner as in Example 1, except that the chlorine concentration was adjusted to 400 ppm by controlling the time for the ultrafiltration.

Example 3

A complex metal oxide fine particle dispersion liquid was prepared in the same manner as in Example 1, except that the chlorine concentration was adjusted to 50 ppm by controlling the time for the ultrafiltration.

Comparative Example 1

A complex metal oxide fine particle dispersion liquid was prepared in the same manner as in Example 1, except that the chlorine concentration was adjusted to 3,000 ppm by controlling the time for the ultrafiltration.

Comparative Example 2

A complex metal oxide fine particle dispersion liquid was prepared in the same manner as in Example 1, except that the chlorine concentration was adjusted to 2,000 ppm by controlling the time for the ultrafiltration.

Comparative Example 3

A complex metal oxide fine particle dispersion liquid was prepared in the same manner as in Example 1, except that the chlorine concentration was adjusted to 1,000 ppm by controlling the time for the ultrafiltration.

Comparative Example 4

A complex metal oxide fine particle dispersion liquid was prepared in the same manner as in Example 1, except that the obtained complex metal oxide fine particle dispersion liquid was subjected to ultrafiltration with pure water in place of 2.5% by mass of aqueous acetic aid solution, and the chlorine concentration in the dispersion liquid was maintained to 50 ppm, and pH to 3.8.

Next, the obtained complex metal oxide fine particle dispersion liquid was measured in terms of chlorine concentration, pH, average primary particle size, average particle diameter measured by a dynamic scattering method, and transmittance. Results are shown in Table 1.

<Chlorine Concentration>

50 ml of each sample was placed on a quartz board, and chlorine concentration was measured using a combustion halogen analyzer (AQF-100, produced by Mitsubishi Chemical Analytech Co., Ltd.).

<Measurement of pH of the Dispersion Liquid>

The pH of the dispersion liquid was measured with pH meter HM-25G (produced by DKK TOA Corporation).

<Measurement of Average Primary Particle Diameter (TEM)>

Average primary particle diameter of each metal oxide fine particles was measured using H-9000 UHR TRANSMISSION ELECTRON MICROSCOPE (produced by Hitachi Ltd.) (Acceleration voltage: 200 kV; the degree of vacuum: $7.6 \times 10^{-9}$ Pa).

<Measurement of Average Particle Diameter (Dynamic Scattering)>

Average particle diameter of each metal oxide fine particle dispersion liquid was measured using hyper sensitive nano particle distribution measuring apparatus (UPA-UT151, produced by Nikkiso Co., Ltd.).

<Measurement of Light Transmittance>

Light transmittance (light path length: 10 mm; wavelength: 500 nm) of each sol was measured using an ultraviolet-visible absorption spectrum measuring apparatus UV-3100 (produced by Shimadzu Corporation).

TABLE 1

| | Cl concentration in dispersion liquid | pH | Average primary particle diameter (TEM) | Average particle diameter (dynamic scattering) | Light transmittance (wavelength: 500 nm) |
|---|---|---|---|---|---|
| Example 1 | 700 ppm | 3.8 | 4.6 nm | 5.0 nm | 94.1% |
| Example 2 | 400 ppm | 3.8 | 4.6 nm | 4.8 nm | 94.3% |
| Example 3 | 50 ppm | 3.8 | 4.6 nm | 4.7 nm | 94.5% |
| Comp. Ex. 1 | 3,000 ppm | 3.8 | 4.6 nm | 19.3 nm | 84.1% |
| Comp. Ex. 2 | 2,000 ppm | 3.8 | 4.6 nm | 12.7 nm | 85.6% |
| Comp. Ex. 3 | 1,000 ppm | 3.8 | 4.6 nm | 8.9 nm | 87.8% |
| Comp. Ex. 4 | 50 ppm | 5.0 | 4.6 nm | 11.6 nm | 86.7% |

Production Example 1

Preparation of Complex Metal Oxide Fine Particle Dimethylacetamide Dispersion 1

To a solution of 1.2 g of p-octylbenzoic acid in 500 g of N, N'-dimethylacetamide, 400 g of the complex metal oxide fine particle sol prepared in Example 1 was added, and the mixture was concentrated under reduced pressure so as to substitute the solvent and reduce the amount of the mixture to about 500 g or less. Thereafter, the concentration was adjusted by the addition of N, N'-dimethylacetamide, whereby 15% by mass of complex metal oxide fine particle N, N'-dimethylacetamide dispersion 1 was yielded.

Production Examples 2-7

Preparation of Complex Metal Oxide Fine Particle Dimethylacetamide Dispersions 2-7

The complex metal oxide fine particle dimethylacetamide dispersions 2-7 were obtained in the same manner as in Production Example 1, except that the complex metal oxide fine particle sol prepared in Examples 2-3 and Comparative Examples 1-4 were used in place of the complex metal oxide fine particle sol prepared in Example 1.

Synthesis Example 1

Synthesis of a Thermoplastic Resin 247.5 g of styrene, 2.50 g of β-carboxyethylacrylate, and a polymerization initiator (V-601, Wako produced by Wako Pure Chemicals Industries, Ltd.) were dissolved in 107.1 g of ethyl acetate, and polymerization was effected at 80° C. under nitrogen to thereby obtain a thermoplastic resin.

The thermoplastic resin was found to have a mass average molecular weight of 35,000 by a GPC. The refractive index measured by Abbe refractomer was 1.59.

Example 4

Preparation of a Complex Composition and Production of a Molding Product

To the complex metal oxide fine particle dimethylacetamide dispersion 1 prepared in Production Example 1, the thermoplastic resin prepared in Synthesis Example 1, n-octyl benzoic acid, and KP-L155 (produced by Kao Corporation) as a plasticizer were added such that the mass ratio of complex metal oxide fine particle solid content:the thermoplastic resin:n-octyl benzoic acid:KP-L155 is 43.5:38.2:6.1:12.2, and the mixture was stirred homogeneously, and then heated under reduced pressure, to thereby concentrate the solvent of dimethylacetamide. The concentrated product was put in a die (produced by SUS) and subjected to a thermal compression molding (at a temperature of 180° C., and at a pressure of 13.7 MPa, for 2 minutes), whereby 1 mm thick transparent molding product as a lens base material was produced.

The obtained transparent molding product was cut and the section was observed using a transmission electron microscope (TEM). As a result, it was confirmed that the metal fine particles were homogeneously dispersed in the resin.

Examples 5-6 and Comparative Examples 5-8

Preparation of a Complex Composition and Production of a Molding Product

A transparent molding product (a lens base material) was produced in the same manner as in Example 4, except that the complex metal oxide fine particle N, N'-dimethylacetamide dispersions 2-7 of Production Examples 2-7 were used in place of the complex metal oxide fine particle N,N'-dimethylacetamide dispersion 1.

Next, the obtained molding products were evaluated in the following properties. Results are shown in Table 2.

<Measurement of Chlorine Concentration of the Molding Product>

5 mg of each molding product was placed on a quartz board, and the chlorine concentration was measured using a combustion halogen analyzer (AQF-100, produced by Mitsubishi Chemical Analytech Co., Ltd.).

<Measurement of Light Transmittance of the Molding Product>

Light transmittance of each molding product was measured with an ultraviolet-visible absorption spectrum measuring apparatus (UV-3100, produced by Shimadzu Corporation).

<Measurement of Refractive Index of the Molding Product>

The refractive index of each molding product was measured with an Abbe refractometer (e.g., DR-M4, produced by Atago Co., Ltd.) at a wavelength of 589 nm.

TABLE 2

| | Dispersion liquid | Chlorine concentration/ inorganic substance in molding product | Transmittance; wavelength 589 nm | Refractive index; 589 nm |
|---|---|---|---|---|
| Example 4 | Example 1 | 5,700 ppm | 85.1% | 1.69 |
| Example 5 | Example 2 | 3,500 ppm | 85.5% | 1.69 |
| Example 6 | Example 3 | 510 ppm | 86.5% | 1.69 |
| Comp. Ex. 5 | Comp. Ex. 1 | 28,400 ppm | immeasurable | immeasurable |
| Comp. Ex. 6 | Comp. Ex. 2 | 16,100 ppm | 53.2% | 1.66 |
| Comp. Ex. 7 | Comp. Ex. 3 | 8,930 ppm | 76.5% | 1.69 |
| Comp. Ex. 8 | Comp. Ex. 4 | 510 ppm | 72.1% | 1.68 |

The metal oxide fine particle dispersion liquid and the molding product obtained by a complex composition containing a resin, of the present invention have light transmittance and lightweight at the same time, and can relatively easily provide lens or the like whose refractive index can be adjusted appropriately. They can also provide lenses or the like having excellent mechanical strength, thermal resistance, and light resistance. Thus the molding product of the present invention is useful in providing a wide variety of optical parts, including lens base material that constitutes lens for spectacles, optical device, optoelectronics, laser, pickup, onboard camera, portable camera, digital camera, OHP, or microlens array, and thus the present invention is excellent in industrial applicability.

What is claimed is:

1. A dispersion liquid of metal oxide fine particles, comprising:
    metal oxide fine particles, and
    a halogen element,
    wherein the amount of the halogen element is 10 ppm to 900 ppm, the pH of the dispersion is 0 to 4, and the metal oxide fine particles comprise at least a complex metal oxide of Sn, Ti, and Zr.

2. The dispersion liquid of metal oxide fine particles according to claim 1, wherein the light transmittance of the dispersion at a wavelength of 500 nm at an optical path length of 10 mm is 90% or more.

3. The dispersion liquid of metal oxide fine particles according to claim 1, wherein the amount of the metal oxide fine particles is 0.1% by mass to 20% by mass.

4. The dispersion of metal oxide fine particles according to claim 1, wherein the metal oxide fine particles have an average primary particle diameter of 1 nm to 20 nm.

5. The dispersion liquid of metal oxide fine particles according to claim 1, wherein the metal oxide fine particles further comprise a metal oxide having at least one metal selected from the group consisting of Zn, Ge, Hf, Si, Mn, Ga, Mo, In, Sb, Ta, V, Y, and Nb; or a complex metal oxide having the metals in combination of two or more.

6. The dispersion of metal oxide fine particles according to claim 1, further comprising water in an amount of 70% by mass or more.

7. The dispersion of metal oxide fine particles according to claim 1, further comprising a carboxylic acid.

8. The dispersion of metal oxide fine particles according to claim 7, wherein the carboxylic acid is acetic acid.

9. The dispersion of metal oxide fine particles according to claim 1, wherein the halogen element is a chlorine atom.

10. A molded product which is obtainable by molding a complex composition which comprises:
 a dispersion liquid of metal oxide fine particles, and
 a resin,
  wherein the dispersion liquid of metal oxide fine particles comprises metal oxide fine particles and a halogen element,
  wherein the amount of the halogen element is 10 ppm to 900 ppm based on the dispersion liquid, the pH of the dispersion liquid is 0 to 4, and the metal oxide fine particles comprise at least a complex metal oxide of Sn, Ti, and Zr.

11. The molded product according to claim 10, wherein the amount of the halogen element is 400 ppm to 6,000 ppm.

12. The molded product according to claim 10, wherein the molded product has a refractive index of 1.60 or more at a wavelength of 589 nm and has a light transmittance of 77% or more at a wavelength of 589 nm with respect to a thickness of 1 mm.

13. The molded product according to claim 10, wherein the amount of the metal oxide fine particles is 20% by mass or more.

14. A lens base material comprising the molded product according to claim 10.

* * * * *